United States Patent
Mossman (10) Patent No.: US 10,426,088 B2
(45) Date of Patent: Oct. 1, 2019

(54) CENTER FEED ASSEMBLY FOR A DRAPER

(71) Applicant: Deere & Company, Moline, IL (US)

(72) Inventor: Michael W. Mossman, Silvis, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/730,442

(22) Filed: Oct. 11, 2017

(65) Prior Publication Data

US 2019/0104682 A1   Apr. 11, 2019

(51) Int. Cl.
*A01D 41/14*   (2006.01)
*A01D 57/20*   (2006.01)

(52) U.S. Cl.
CPC .......... *A01D 41/142* (2013.01); *A01D 57/20* (2013.01)

(58) Field of Classification Search
CPC ...... A01D 41/142; A01D 57/20; A01D 41/14; A01D 61/002; A01D 43/06; A01D 61/008; A01D 41/16; A01D 61/02
See application file for complete search history.

(56) References Cited

U.S. PATENT DOCUMENTS

| | | | |
|---|---|---|---|
| 2,608,041 A * | 8/1952 | Schoenrock | A01D 61/008 198/518 |
| 3,468,107 A | 9/1969 | Van der Lely | |
| 3,683,601 A | 8/1972 | Van der Lely | |
| 4,487,004 A | 12/1984 | Kejr | |
| 5,464,371 A | 11/1995 | Honey | |
| 5,577,563 A | 11/1996 | Holen | |
| 5,673,543 A | 10/1997 | Richardson et al. | |
| 5,724,798 A | 3/1998 | Stefl et al. | |
| 5,845,472 A | 12/1998 | Arnold | |
| 6,003,615 A | 12/1999 | Moore | |
| 6,202,397 B1 * | 3/2001 | Watts | A01D 61/002 56/14.5 |
| 6,675,568 B2 | 1/2004 | Patterson et al. | |

(Continued)

FOREIGN PATENT DOCUMENTS

| | | |
|---|---|---|
| EP | 0750833 A1 | 1/1997 |
| EP | 2842407 A1 | 3/2015 |

(Continued)

OTHER PUBLICATIONS

European Patent Office Search Report for Application No. 18200409.3 dated Mar. 15, 2019 (7 pages).

(Continued)

*Primary Examiner* — Arpad Fabian-Kovacs
(74) *Attorney, Agent, or Firm* — Michael Best & Friedrich LLP (57) ABSTRACT

A draper head for a combine includes a center section adapted for attachment to the combine. The center section is provided with a center feed assembly that includes first and second belt frames. Each of the first and second belt frames supports a drive roller, an idler roller, and a belt extending between the drive roller and the idler roller. The draper head also includes first and second wings extending in opposite lateral directions from the center section. Each of the first and second wings includes a draper belt operable to feed crop material toward the center section. The second belt frame is movable relative to the first belt frame.

20 Claims, 8 Drawing Sheets

(56) References Cited

U.S. PATENT DOCUMENTS

| | | | |
|---|---|---|---|
| 6,865,871 B2* | 3/2005 | Patterson | A01D 57/20 56/14.5 |
| 7,168,226 B2 | 1/2007 | McLean et al. | |
| 7,470,180 B2* | 12/2008 | Honey | A01D 41/16 460/105 |
| 7,540,130 B2 | 6/2009 | Coers et al. | |
| 7,587,885 B2* | 9/2009 | Tippery | A01D 57/20 56/14.5 |
| 7,802,417 B2* | 9/2010 | Sauerwein | A01D 41/14 56/181 |
| 7,918,076 B2 | 4/2011 | Talbot | |
| 7,992,372 B1 | 8/2011 | Coers et al. | |
| 8,087,224 B1 | 1/2012 | Coers et al. | |
| 8,281,561 B2* | 10/2012 | Dow | A01D 57/20 56/181 |
| 8,336,280 B2* | 12/2012 | Lovett | A01D 61/002 56/181 |
| 8,393,135 B2* | 3/2013 | Honas | A01D 41/14 56/181 |
| 8,544,250 B2* | 10/2013 | Lovett | A01D 41/14 56/153 |
| 9,072,222 B2 | 7/2015 | Bomleny et al. | |
| 9,144,199 B2 | 9/2015 | Ritter et al. | |
| 9,161,492 B2* | 10/2015 | Fuechtling | A01D 41/14 |
| 9,198,353 B2 | 12/2015 | Ritter et al. | |
| 9,526,206 B2 | 12/2016 | Schulze Ruckamp et al. | |
| 9,992,924 B2 | 6/2018 | van Vooren et al. | |
| 10,070,575 B2 | 9/2018 | Wenger et al. | |
| 10,299,437 B2 | 5/2019 | Farley et al. | |
| 2002/0035826 A1 | 3/2002 | Albinger et al. | |
| 2003/0074876 A1 | 4/2003 | Patterson et al. | |
| 2003/0182912 A1 | 10/2003 | Boll | |
| 2003/0226342 A1 | 12/2003 | Boeckmann et al. | |
| 2004/0123575 A1 | 7/2004 | Rickert | |
| 2005/0284124 A1* | 12/2005 | Patterson | A01D 61/006 56/364 |
| 2006/0225900 A1 | 10/2006 | Kimball | |
| 2008/0072560 A1 | 3/2008 | Talbot | |
| 2008/0161077 A1* | 7/2008 | Honey | A01D 41/16 460/106 |
| 2008/0295473 A1 | 12/2008 | Tippery et al. | |
| 2009/0320431 A1* | 12/2009 | Puryk | A01D 41/14 56/181 |
| 2012/0047866 A1* | 3/2012 | Fuechtling | A01D 41/14 56/153 |
| 2012/0279191 A1 | 11/2012 | Sauerwein et al. | |
| 2013/0097986 A1 | 4/2013 | Lovett et al. | |
| 2014/0033670 A1 | 2/2014 | Cressoni | |
| 2014/0041354 A1* | 2/2014 | Coon | A01D 41/14 56/158 |
| 2015/0013795 A1 | 1/2015 | Ritter et al. | |
| 2015/0373907 A1 | 12/2015 | Schulze Ruckamp et al. | |
| 2016/0183462 A1* | 6/2016 | Magisson | A01D 47/00 56/189 |
| 2016/0262301 A1 | 9/2016 | van Vooren et al. | |
| 2016/0360699 A1* | 12/2016 | Allochis | A01D 43/06 |
| 2017/0094904 A1 | 4/2017 | Sudhues et al. | |
| 2017/0113876 A1* | 4/2017 | Jager | A01D 61/02 |
| 2017/0223896 A1* | 8/2017 | Schmid | A01D 67/00 |
| 2017/0251606 A1* | 9/2017 | Van Overschelde | A01F 12/10 |
| 2017/0367266 A1 | 12/2017 | Vandendriessche et al. | |
| 2018/0035598 A1 | 2/2018 | Wenger et al. | |
| 2018/0070526 A1 | 3/2018 | Henry | |
| 2018/0084724 A1* | 3/2018 | Fuchtling | A01D 61/008 |
| 2018/0338418 A1 | 11/2018 | Ricketts et al. | |
| 2019/0045709 A1 | 2/2019 | Schroeder et al. | |
| 2019/0053429 A1 | 2/2019 | Cook et al. | |

FOREIGN PATENT DOCUMENTS

| | | |
|---|---|---|
| EP | 3066910 A1 | 9/2016 |
| EP | 3087819 A2 | 11/2016 |

OTHER PUBLICATIONS

European Patent Office Search Report for Application No. 18200436.6 dated Mar. 19, 2019 (9 pages).

European Patent Office Search Report for Application No. 18199247.0 dated Mar. 22, 2019 (7 pages).

United States Patent Office Action for U.S. Appl. No. 15/729,867 dated May 8, 2019 (13 pages).

European Patent Office Search Report for Application No. 18199265.2 dated May 17, 2019 (12 pages).

United States Patent Office Action for U.S. Appl. No. 15/785,831 dated Jul. 3, 2019 (10 pages).

* cited by examiner

CENTER FEED ASSEMBLY FOR A DRAPER

BACKGROUND

The present disclosure relates to agricultural equipment, and more particularly to draper heads for combines.

SUMMARY

The disclosure provides, in one aspect, a draper head for a combine. The draper head includes a center section adapted for attachment to the combine. The center section is provided with a center feed assembly that includes first and second belt frames. Each of the first and second belt frames supports a drive roller, an idler roller, and a belt extending between the drive roller and the idler roller. The draper head also includes first and second wings extending in opposite lateral directions from the center section. Each of the first and second wings includes a draper belt operable to feed crop material toward the center section. The second belt frame is movable relative to the first belt frame.

The disclosure provides, in another aspect, a center feed assembly for a combine draper head. The center feed assembly includes, a rear frame, a first belt frame pivotally coupled to the rear frame, a second belt frame pivotally coupled to the rear frame, a bulkhead extending from the rear frame between the first and second belt frames, and a front frame having a center portion pivotally coupled to the bulkhead. The front frame also includes a first end portion engageable with the first belt frame and a second end portion engageable with the second belt frame.

The disclosure provides, in another aspect, a center feed assembly for attachment to a feederhouse of a combine. The center feed assembly includes a first endless belt configured to convey crop material toward the feederhouse and a second endless belt configured to convey crop material toward the feederhouse. The first endless belt and the second endless belt are proportionately pivotable relative to one another in response to movement of a cutterbar of the combine.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

DETAILED DESCRIPTION

Figure 1:
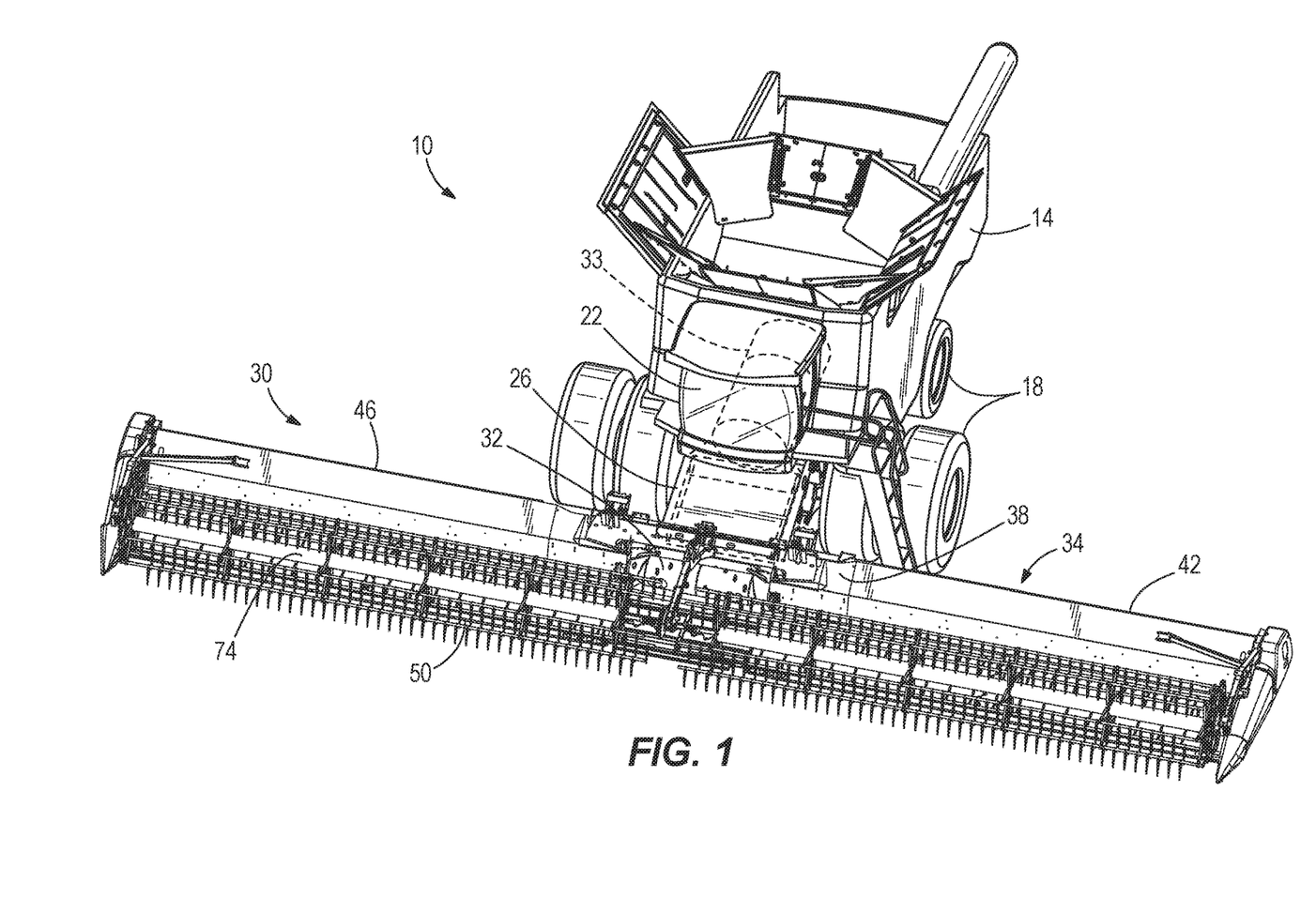
FIG. 1 is a perspective view of a combine including a draper head with a center feed assembly according to one embodiment of the disclosure.
Figure 2:
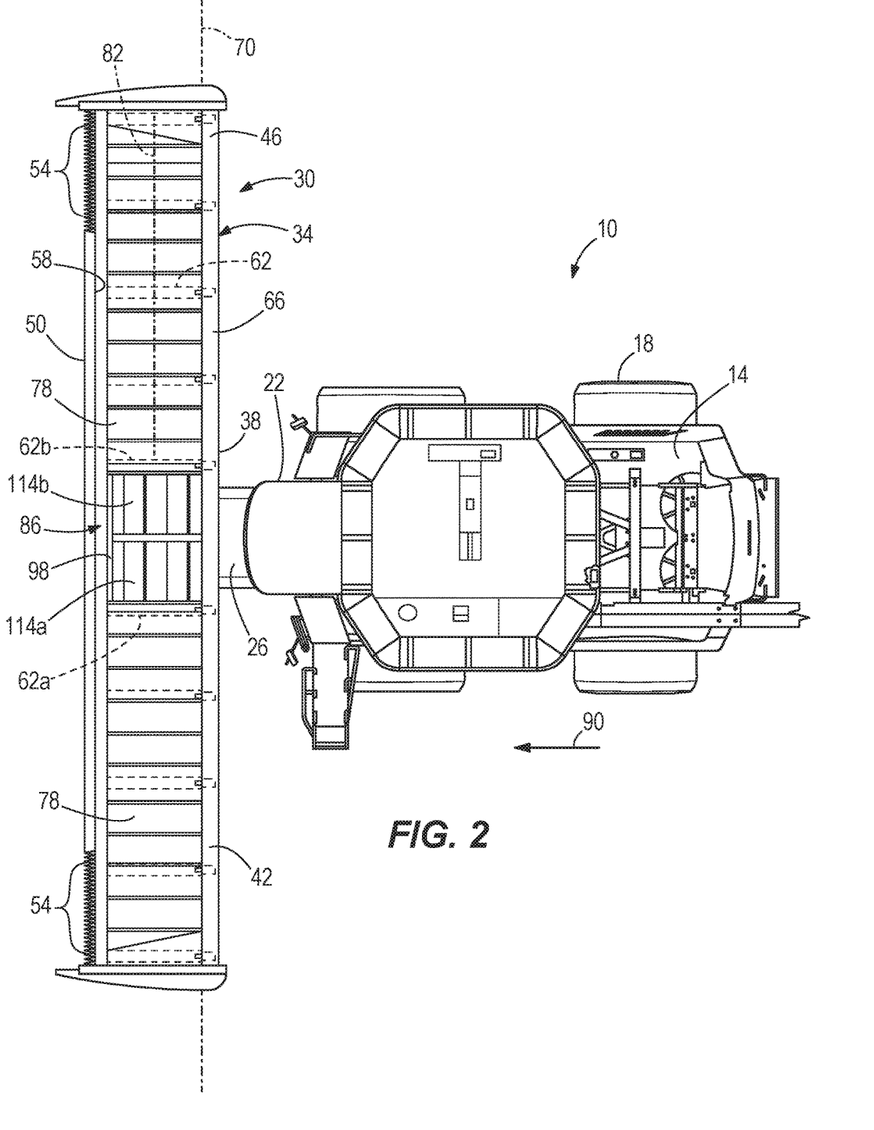
FIG. 2 is a top view of the combine of FIG. 1.

FIGS. 1 and 2 illustrate an agricultural machine 10, which is a combine harvester (or simply "combine") 10. The combine 10 includes a housing 14, a plurality of ground-engaging members (e.g., wheels) 18 supporting the housing 14, and an operator cab 22 disposed at a front end of the housing 14. The combine 10 also includes a feederhouse 26 extending from the front end of the housing 14 generally underneath the operator cab 22 and a head 30 coupled to the feederhouse 26. The head 30 is configured to cut or pick up pre-cut crop material and feed the crop material into the feederhouse 26, which then draws the crop material into the housing 14 (e.g., via a rotating feeder drum 32; FIG. 1). Within the housing 14, harvested crop material can be threshed to remove stalk material or straw via a separating system 33, leaving crop grains that are to be collected. The crop grains may be further processed within the housing 14 (e.g., to remove chaff) and ultimately stored within and/or discharged from the housing 14. The threshing and processing of the crop material can be accomplished by any one of a variety of mechanisms.

Referring to FIG. 2, the head 30 includes a frame 34 having a plurality of sections. In the illustrated embodiment, the frame 34 includes a center section 38 coupled to the feederhouse 26, a left wing 42 coupled to the center section 38, and a right wing 46 coupled to the center section 38 opposite the left wing 42. In some embodiments, the wings 42, 46 can be pivotally or otherwise flexibly supported by the center section 38 to allow independent movement of the two wings 42, 46 with respect to the center section 38. A cutterbar 50 extends across a bottom leading edge of the head 30 to cut crops near the ground (e.g., by reciprocating a plurality of overlapping knives 54). The illustrated cutterbar 50 spans both wings 42, 46 and the center section 38, and can flex to accommodate the movement of the wings 42, 46 relative to the center section 38 (e.g., when the head 30 encounters uneven ground). A rear side 58 of the cutterbar 50 is coupled to a plurality of float arms 62, which are spaced along the width of the frame 34. In the illustrated embodiment, the float arms 62 are independently pivotally coupled to a rear member 66 of the frame 34 about a pivot axis 70, which facilitates flexure of the cutterbar 50. The float arms 62 may be coupled to skid plates (not shown) or other ground-engaging features such that the float arms 62 are pivotable in response to encountering uneven ground. In other embodiments, one or more active compensating systems (including, for example, one or more hydraulic actuators) may be provided to actively control movement of the float arms 62 and/or the wings 42, 46 in response to sensed or predicted ground variations. The head 30 thus allows consistent low cutting of the crop material from the ground, even over uneven ground.

The illustrated head 30 is configured as a draper head and includes at least one rotatable reel 74 (FIG. 1) that engages and delivers standing crops to a plurality of endless conveyor belts. In particular, each wing 42, 46 includes at least one draper belt 78 oriented to convey the cut crop material inward toward the center section 38 (i.e. along a transverse axis 82; FIG. 2). The center section 38 further includes a center feed assembly 86 to convey the cut crop material into the feederhouse 26 in a direction parallel to a travel direction 90 of the combine 10 and perpendicular to the draper belts 78 and the transverse axis 82. In some embodiments, the draper belts 78 may be replaced by one or more augers or other conveying mechanisms, and in some embodiments, the reel 74 may be omitted.

Figure 3:
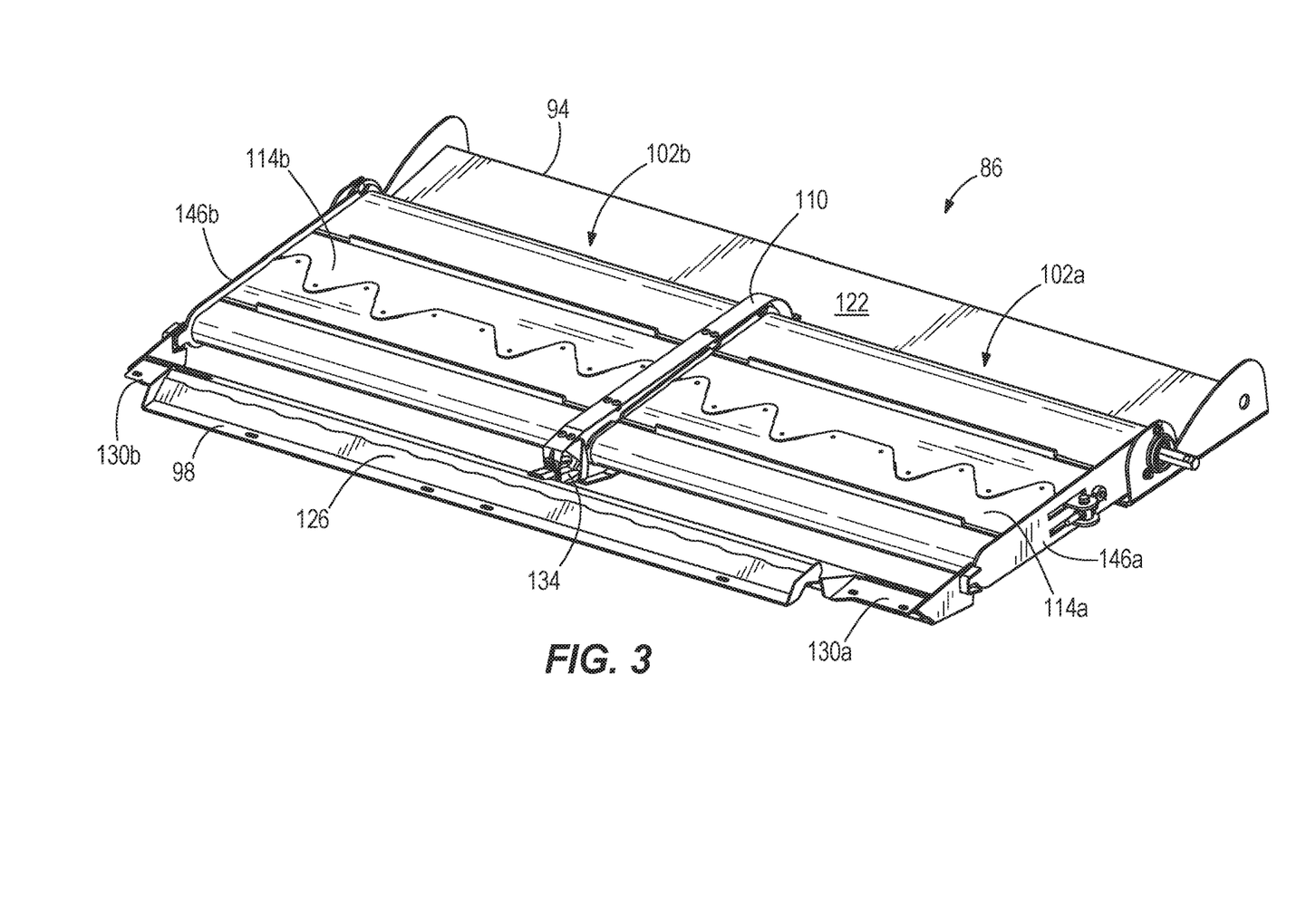
FIG. 3 is a perspective view of the center feed assembly of FIG. 1 illustrated in a neutral position.

Referring to FIG. 3, the center feed assembly 86 includes a rear frame 94, a front frame 98, left and right belt frames 102a, 102b extending between the rear frame 94 and the front frame 98, and a bulkhead 110 extending between the rear frame 94 and the front frame 98. Each of the belt frames 102a, 102b supports a respective feed belt 114a, 114b. As described in greater detail below, the belt frames 102a, 102b are movable relative to one another to track the cutterbar 50. This advantageously minimizes gaps that may form between the cutterbar 50 and the feed belts 114a, 114b when the head 30 moves over uneven ground, thereby reducing lost crop material.

The rear frame 94 of the center feed assembly 86 is attachable to the feederhouse 26 (e.g., via a ridged or pivotal connection) so as to maintain a parallel relationship between an upper ramp surface 122 of the rear frame 94 and the feederhouse 26. The bulkhead 110 extends rigidly from the center of the rear frame 94, between the left and right belt frames 102a, 102b. In the illustrated embodiment, the front frame 98 includes a sump pan 126 that extends along the rear side 58 of the cutter bar 50. The front frame 98 also includes left and right flanges or end portions 130a, 130b that are attached to float arms 62a, 62b on the left and right sides of the center feed assembly 86 (FIG. 2). A forward end of the bulkhead 110 carries a pivot joint 134 to which the front frame 98 is pivotally coupled. As such, the front frame 98 is pivotable relative to the bulkhead 110 about a front frame pivot axis 138 (FIG. 5).

Figure 4:
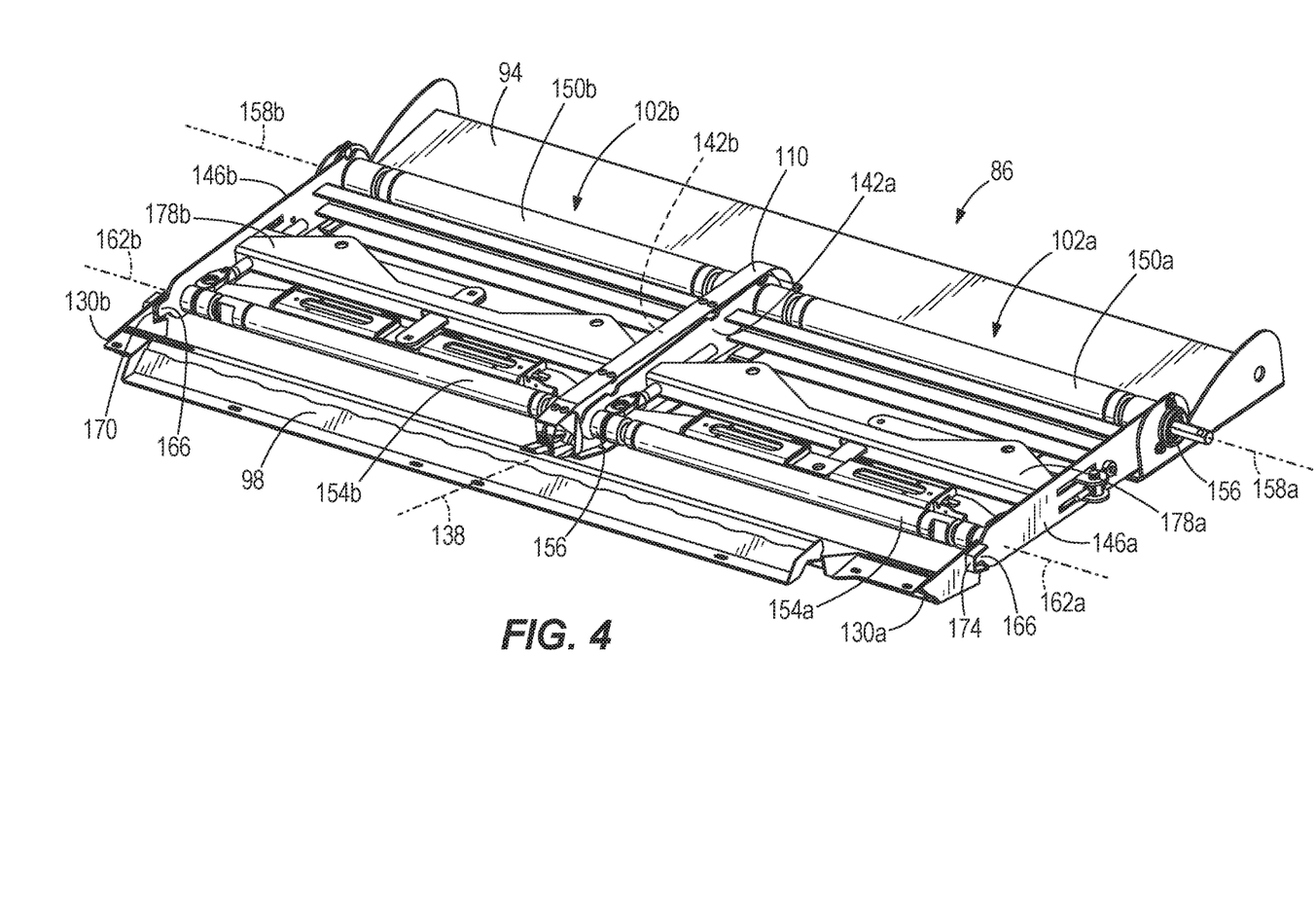
FIG. 4 is a perspective view of the center feed assembly of FIG. 1 with feed belts removed.

Each of the belt frames 102a, 102b includes an inner bracket 142a, 142b and an outer bracket 146a, 146b extending from the rear frame 94 to the front frame 98 (FIG. 4). The center feed assembly 86 includes a first drive roller 150a and a first idler roller 154a supported by the left belt frame 102a, and a second drive roller 150b and a second idler roller 154b supported by the right belt frame 102b. In some embodiments, the drive rollers 150a, 150b may each be part of a unitary drive roller that extends through the bulkhead 110.

The ends of the drive rollers 150a, 150b and idler rollers 154a, 154b are rotatably supported by bearings 156 mounted to the brackets 142a, 146a, 142b, 146b of the respective belt frames 102a, 102b. The first feed belt 114a wraps around the first rollers 150a, 154a, and the second feed belt 114b wraps around the second rollers 150b, 154b (FIG. 3). Each of the drive rollers 150a, 150b is coupled to receive torque from a prime mover (such as a hydraulic motor, an electric motor, the engine of the combine, and the like; not shown) to drive the feed belts 114a, 114b. The first drive roller 150a defines a first drive roller axis 158a, and the first idler roller 154a defines a first idler roller axis 162a (FIG. 4). The second drive roller 150b defines a second drive roller axis 158b, and the second idler roller 154b defines a second idler roller axis 162b. In the illustrated embodiment, all of the axes 158a, 158b, 162a, 162b are parallel. In addition, the driver roller axes 158a, 158b are coaxial. In some embodiments, the drive roller axes 158a, 158b may not be coaxial. In some embodiments, all of the axes 158a, 158b, 162a, 162b may not be parallel.

Figure 5:
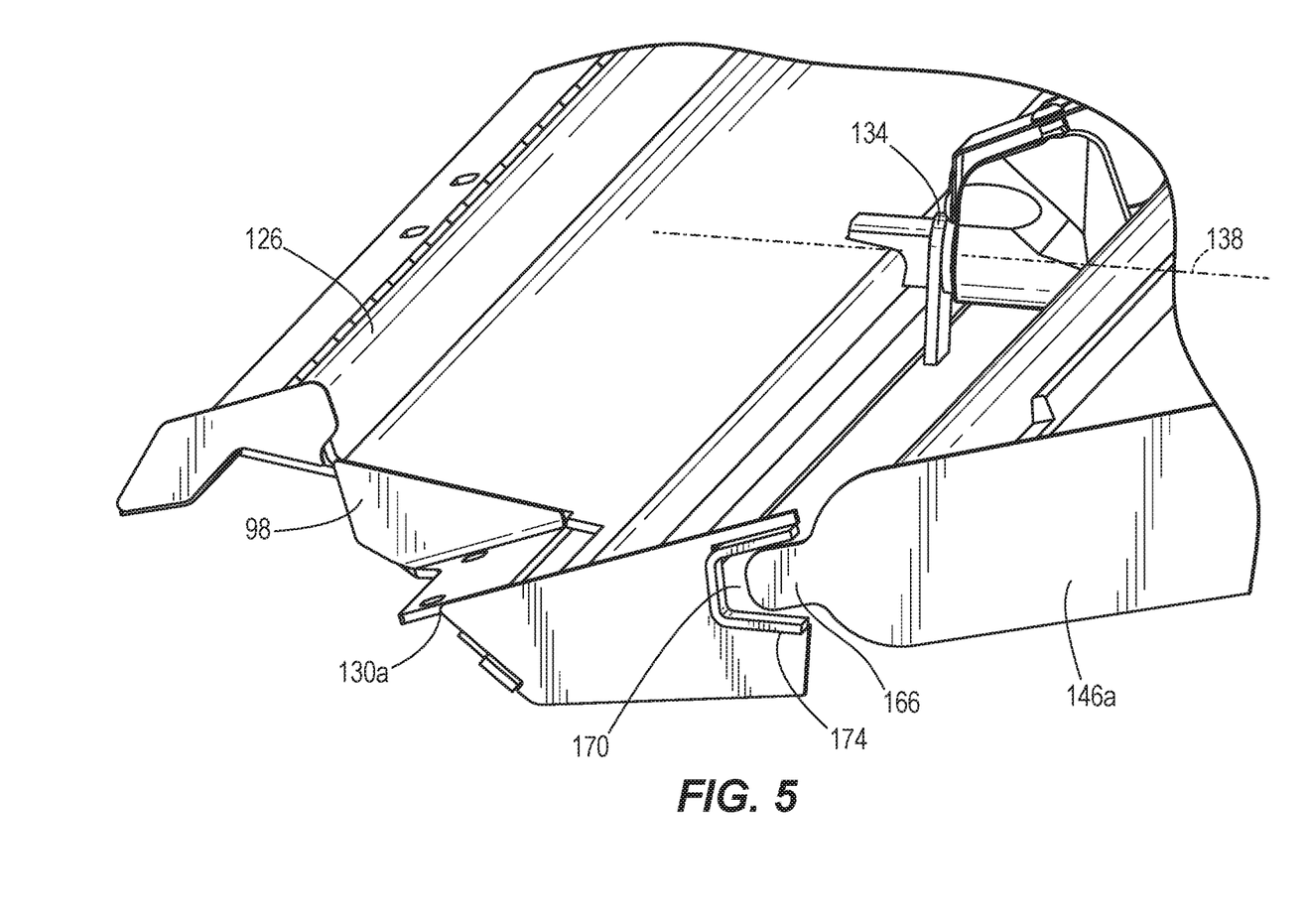
FIG. 5 is an enlarged view of a portion of the center feed assembly of FIG. 1.

Referring to FIGS. 4 and 5, the rear end of each of the outer brackets 146a, 146b is pivotally coupled to the rear frame 94, and the rear end of each of the inner brackets 142a, 142b is pivotally coupled to the bulkhead 110 (FIG. 4). As such, the brackets 142a, 146a of the left belt frame 102a are pivotable about the first drive roller axis 158a, and the brackets 142b, 146b of the right belt frame 102b are pivotable about the second drive roller axis 158b (which, in the illustrated embodiment, is coaxial with the first drive roller axis 158a). Referring to FIGS. 4 and 5, the outer brackets 146a, 146b each include a tab 166 that is received within a corresponding recess 170 on the front frame 98 (FIG. 5). The tabs 166 are slidable within the recesses 170 to permit limited relative motion between the front frame 98 and the outer brackets 146a, 146b. A wall 174 surrounding the recess 170 is engageable with the tab 166 to raise or lower the associated outer bracket 146a, 146b in response to pivotal motion of the front frame 98 about the axis 138. In the illustrated embodiment, the belt frame 102a, 102b include cross-bars 178a, 178b that connect the outer brackets 146a, 146b and the inner brackets 142a, 142b such that each inner bracket 142a, 142b is raised or lowered with the outer bracket 146a, 146b. This in turn raises or lowers the corresponding idler roller 154a, 154b, thereby varying the inclination of the belts 114a, 114b.

In operation, when the combine 10 travels over level ground, the center feed assembly 86 assumes a neutral position as illustrated in FIGS. 3 and 4. In the neutral position, the axes 162a, 162b of the idler rollers 154a, 154b are coaxial, and the top sides of the belts 114a, 114b are generally coplanar. As the head 30 advances toward crops to be cut, the reciprocating knives 54 on the cutterbar 50 cut the crop material near the ground, and the reel 74 rotates to deposit the cut crop material on to the head 30 (FIG. 2). The draper belts 78 bring crop material from the wings 42, 46 toward the center section 38, where the feed belts 114a, 114b then convey the crop material to the feederhouse 26.

Figure 6:
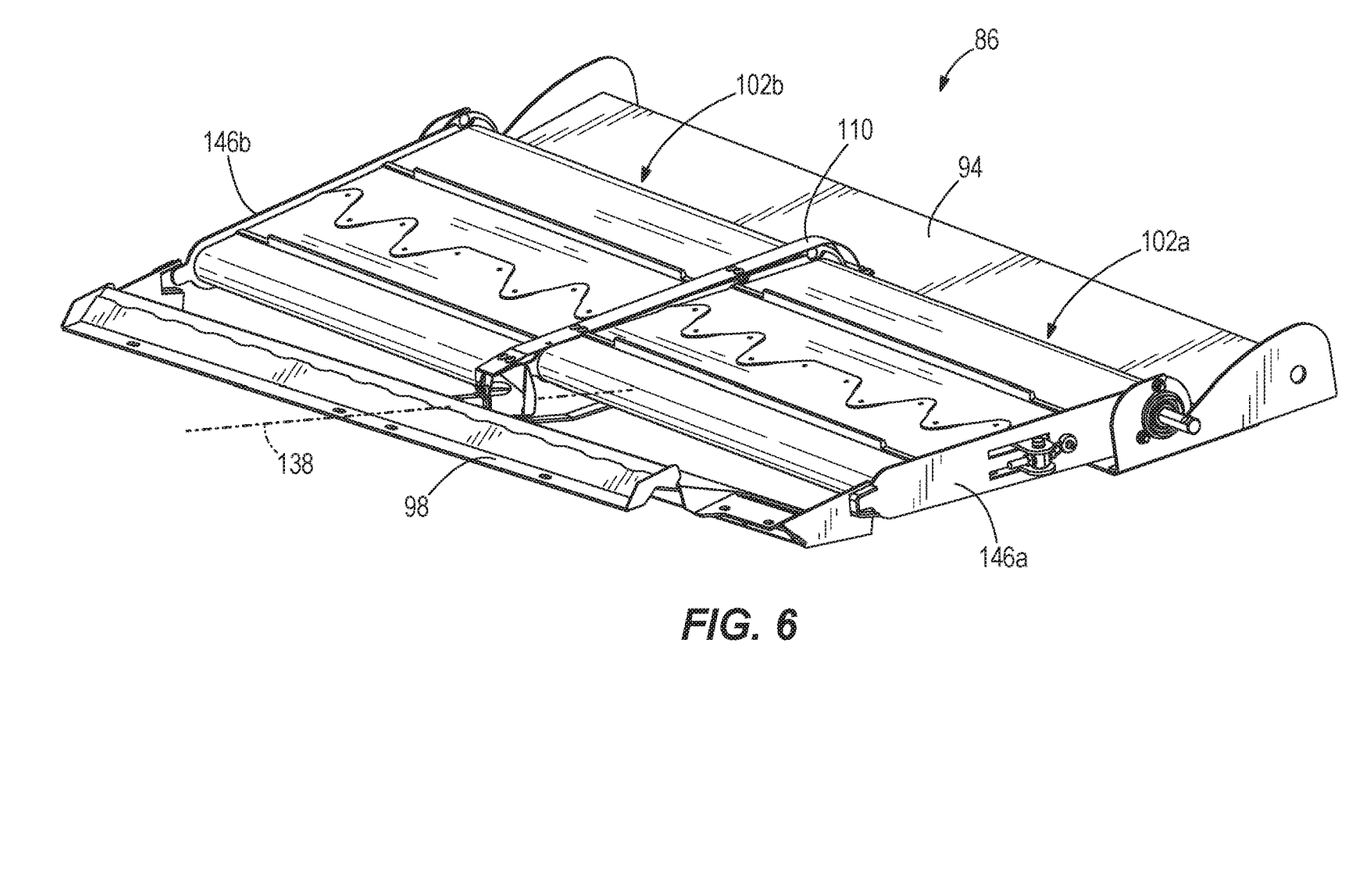
FIG. 6 is a perspective view of the center feed assembly of FIG. 1 illustrated in a first compensating position.
Figure 8:
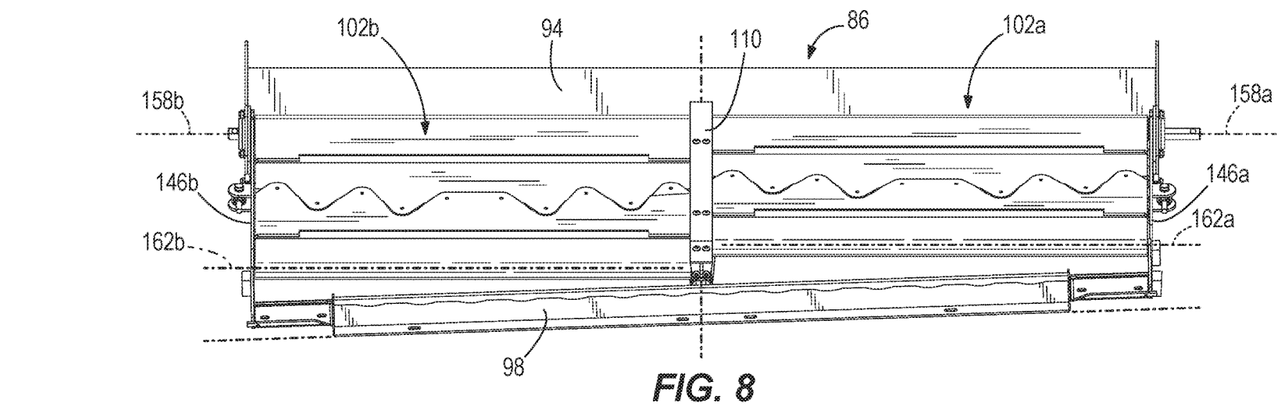
FIG. 8 is a front perspective view of the center feed assembly of FIG. 6.

If the head 30 encounters uneven ground that slopes from right to left, for example, the cutterbar 50 may flex as the float arms 62a, 62b pivot in opposite directions (e.g., the float arm 62a pivots upward and the float arm 62b pivots downward) about the float arm pivot axis 70 (FIG. 2). This causes the front frame 98 to pivot about the axis 138 such that the left end portion 130a of the front frame 98 moves generally upward and the right end portion 130b moves generally downward toward a first compensating position of the center feed assembly 86 illustrated in FIGS. 6 and 8. As the left end portion 130a moves upward, the wall 174 engages the tab 166 on the outer bracket 146a of the left belt frame 102a, causing the left belt frame 102a to pivot upward relative to the rear frame 94 about the drive roller axis 158a. Accordingly, the idler roller axis 162a moves upward, changing the inclination of the belt 114a. Simultaneously, as the right end portion 130b moves downward, the wall 174 engages the tab 166 on the outer bracket 146b of the right belt frame 102b, causing the right belt frame 102b to pivot downward relative to the rear frame 94 about the drive roller axis 158b. Accordingly, the idler roller axis 162b moves downward, changing the inclination of the belt 114b. Thus, the belt frames 102a, 102b (and the belts 114a, 114b) are proportionately pivotable relative to each other in response to flexure of the cutterbar 50 and corresponding movement of the float arms 62a, 62b.

Figure 7:
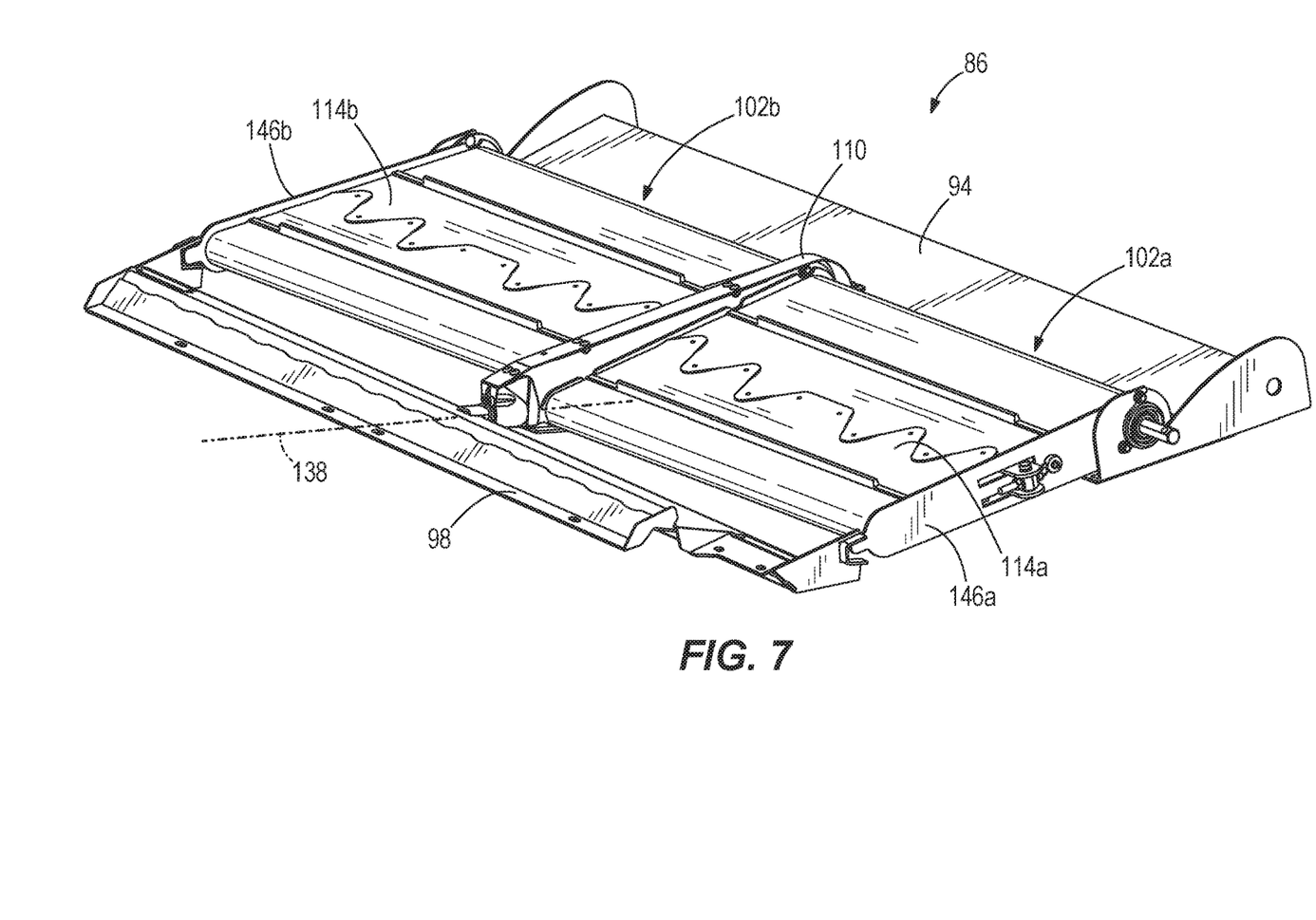
FIG. 7 is a perspective view of the center feed assembly of FIG. 1 illustrated in a second compensating position.
Figure 9:
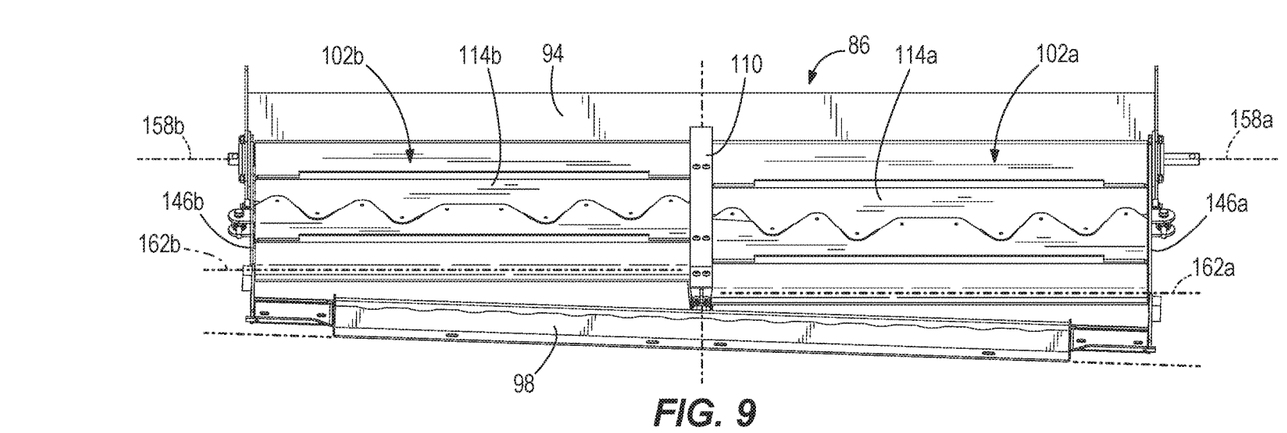
FIG. 9 is a front perspective view of the center feed assembly of FIG. 7.

If the head 30 encounters uneven ground that slopes from left to right, for example, the cutterbar 50 may flex as the float arms 62a, 62b pivot in opposite directions (e.g., the float arm 62a pivots downward and the float arm 62b pivots upward) about the float arm pivot axis 70 (FIG. 2). This causes the front frame 98 to pivot about the axis 138 such that the left end portion 130a of the front frame 98 moves generally downward and the right end portion 130b moves generally upward toward a second compensating position of the center feed assembly 86 illustrated in FIGS. 7 and 9. As the left end portion 130*a* moves downward, the wall 174 engages the tab 166 on the outer bracket 146*a* of the left belt frame 102*a*, causing the left belt frame 102*a* to pivot downward relative to the rear frame 94 about the drive roller axis 158*a*. Accordingly, the idler roller axis 162*a* moves downward, changing the inclination of the belt 114*a*. Simultaneously, as the right end portion 130*b* moves upward, the wall 174 engages the tab 166 on the outer bracket 146*b* of the right belt frame 102*b*, causing the right belt frame 102*b* to pivot upward relative to the rear frame 94 about the drive roller axis 158*b*. Accordingly, the idler roller axis 162*b* moves upward, changing the inclination of the belt 114*b*.

Thus, the disclosure provides a draper center feed assembly that has multiple feed belts supported on movable belt frames. The belt frames can pivot up and down in opposite directions, which advantageously minimizes gaps that may form between the cutterbar and the feed belts when the head moves over uneven ground, thereby reducing lost crop material.

Various features of the disclosure are set forth in the following claims.

What is claimed is:

1. A draper head for a combine, the draper header comprising:
   a center section adapted for attachment to the combine and provided with a center feed assembly, the center feed assembly including first and second belt frames each supporting a drive roller, an idler roller, and a belt extending between the drive roller and the idler roller; and
   first and second wings extending in opposite lateral directions from the center section, each of the first and second wings including a draper belt operable to feed crop material toward the center section,
   wherein the second belt frame is movable relative to the first belt frame.

2. The draper head of claim 1, wherein the center feed assembly further includes a rear frame, a bulkhead extending from the rear frame, and a front frame pivotally coupled to the bulkhead opposite the rear frame.

3. The draper head of claim 2,
   wherein each of the first and second belt frames includes an inner bracket and an outer bracket,
   wherein the drive roller and the idler roller extend between the inner bracket and the outer bracket, and
   wherein the front frame is engageable with the outer bracket of the second belt frame to move the second belt frame relative to the first belt frame in response to pivotal movement of the front frame.

4. The draper head of claim 3, further comprising
   a cutterbar extending along the center section and the first and second wings; and
   a plurality of movable float arms configured to support the cutter bar,
   wherein the front frame is coupled to at least one of the plurality of float arms such that movement of the at least one float arm causes the front frame to pivot.

5. The draper head of claim 1, further comprising a cutterbar extending along the center section and the first and second wings, wherein the second belt frame is movable relative to the first belt frame in response to flexure of the cutterbar.

6. The draper head of claim 1, wherein the center feed assembly further includes a rear frame, and wherein the first and second belt frames are each pivotable relative to the rear frame.

7. The draper head of claim 6, wherein the drive roller supported by the first belt frame defines a first axis, wherein the drive roller supported by the second belt frame defines a second axis, wherein the first belt frame is pivotable relative to the rear frame about the first axis, and wherein the second belt frame is pivotable relative to the rear frame about the second axis.

8. The draper head of claim 7, wherein the first axis and the second axis are coaxial.

9. A center feed assembly for a combine draper head, the center feed assembly comprising:
   a rear frame;
   a first belt frame pivotally coupled to the rear frame;
   a second belt frame pivotally coupled to the rear frame;
   a bulkhead extending from the rear frame between the first and second belt frames; and
   a front frame having a center portion pivotally coupled to the bulkhead, a first end portion engageable with the first belt frame, and a second end portion engageable with the second belt frame.

10. The center feed assembly of claim 9, wherein pivotal movement of the front frame relative to the bulk head causes pivotal movement of the first belt frame and the second belt frame relative to the rear frame.

11. The center feed assembly of claim 10, wherein pivotal movement of the front frame relative to the bulk head causes pivotal movement of the first belt frame in a first direction and pivotal movement of the second belt frame in a second direction opposite the first direction.

12. The center feed assembly of claim 9, further comprising:
   a first drive roller supported by the first belt frame;
   a first idler roller supported by the first belt frame;
   a first belt extending between first drive roller and the first idler roller;
   a second drive roller supported by the second belt frame;
   a second idler roller supported by the second belt frame; and
   a second belt extending between the second drive roller and the second idler roller.

13. The center feed assembly of claim 12, wherein each of the first and second belt frames includes an inner bracket and an outer bracket, wherein the first drive roller and the first idler roller extend between the inner and outer brackets of the first belt frame, and wherein the second drive roller and the second idler roller extend between the inner and outer brackets of the second belt frame.

14. The center feed assembly of claim 13, wherein the first end portion is engageable with the outer bracket of the first belt frame, and wherein the second end portion is engageable with the outer bracket of the second belt frame.

15. The center feed assembly of claim 12, wherein the first drive roller defines a first axis, wherein the second drive roller defines a second axis, wherein the first belt frame is pivotable about the first axis, and wherein the second belt frame is pivotable about the second axis.

16. A center feed assembly for attachment to a feederhouse of a combine, the center feed assembly comprising:
   a first endless belt configured to convey crop material toward the feederhouse; and
   a second endless belt configured to convey crop material toward the feederhouse, wherein the first endless belt and the second endless belt are proportionately pivotable relative to one another in response to movement of a cutterbar of the combine.

17. The center feed assembly of claim 16, wherein the first endless belt and the second endless belt are proportionately pivotable in opposite directions in response to movement of the cutterbar.

18. The center feed assembly of claim 16, further comprising:
   a first belt frame supporting a first drive roller and a first idler roller, the first endless belt extending between the first drive roller and the first idler roller;
   a second belt frame supporting a second drive roller and a second idler roller, the second endless belt extending between the second drive roller and the second idler roller; and
   a front frame configured to pivot in response to movement of the cutterbar,
   wherein the front frame is engageable with the first belt frame and the second belt frame such that pivotal movement of front frame causes the first and second endless belts to pivot.

19. The center feed assembly of claim 18, wherein the front frame includes a first end portion having a first recess and a second end portion having a second recess, wherein the first belt frame includes a first tab slidably received in the first recess, and wherein the second belt frame includes a second tab slidably received in the second recess.

20. The center feed assembly of claim 18, wherein the first endless belt is pivotable about a first axis, wherein the second endless belt is pivotable about a second axis, and wherein the front frame is pivotable about a third axis perpendicular to the first axis and the second axis.

* * * * *